United States Patent
Weng

(10) Patent No.: US 9,966,113 B1
(45) Date of Patent: May 8, 2018

(54) SYNCHRONIZED PLAYING SYSTEM FOR VIRTUAL REALITY IMAGE AND SYNCHRONIZED PLAYING METHOD FOR USING THE SAME

(71) Applicant: Brogent Technologies Inc., Kaohsiung (TW)

(72) Inventor: Dah-Cheng Weng, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 0 days. days.

(21) Appl. No.: 15/472,244

(22) Filed: Mar. 28, 2017

(30) Foreign Application Priority Data

Jan. 9, 2017 (TW) .............................. 106100634 A

(51) Int. Cl.
| | |
|---|---|
| *H04N 5/93* | (2006.01) |
| *H04N 9/80* | (2006.01) |
| *G11B 27/10* | (2006.01) |
| *H04N 5/775* | (2006.01) |
| *G06K 19/06* | (2006.01) |
| *G06K 7/14* | (2006.01) |
| *A63G 31/16* | (2006.01) |
| *A63G 7/00* | (2006.01) |
| *H04W 84/12* | (2009.01) |

(52) U.S. Cl.
CPC ............ *G11B 27/10* (2013.01); *G06K 7/1413* (2013.01); *G06K 7/1452* (2013.01); *G06K 19/06028* (2013.01); *H04N 5/775* (2013.01); *H04W 84/12* (2013.01)

(58) Field of Classification Search
USPC ...... 386/353, 239, 248, 326; 463/30, 32, 55, 463/48, 49
See application file for complete search history.

(56) References Cited

U.S. PATENT DOCUMENTS

| | | | | |
|---|---|---|---|---|
| 5,662,523 A | * | 9/1997 | Yasumaru | A63F 13/12 273/DIG. 17 |
| 6,409,509 B2 | * | 6/2002 | Shiina | A63G 31/16 434/55 |
| 7,031,384 B2 | * | 4/2006 | Kondo | G06T 7/20 375/240.01 |
| 9,839,857 B2 | * | 12/2017 | Wagner | A63G 31/16 |

(Continued)

*Primary Examiner* — Daquan Zhao
(74) *Attorney, Agent, or Firm* — Chun-Ming Shih; HDLS IPR Services

(57) ABSTRACT

A synchronized playing system for virtual reality (VR) image adopted by a ride system includes a track and a car running along the track. The system includes a controller system, a synchronization system and a visualization system. The visualization system includes multiple VR apparatuses respectively worn by the passengers of the car. The synchronization system includes a barcode arranged on top face of the track and a proximity sensor arranged on bottom face of the car. The controller system includes a calculation unit and a wireless communication unit communicated wirelessly with the visualization system. The calculation unit generates and transmits a control signal to the visualization system based on barcode content when the car is moving and the barcode is sensed by the proximity sensor. Therefore, each VR apparatus may perform synchronizing process to current played VR video based on current position of the car.

19 Claims, 11 Drawing Sheets

(56) References Cited

U.S. PATENT DOCUMENTS

| | | | | |
|---|---|---|---|---|
| 2015/0097863 A1* | 4/2015 | Aланiz | ................. | G06T 19/006 |
| | | | | 345/633 |
| 2016/0111014 A1* | 4/2016 | Lin | ....................... | G09B 9/042 |
| | | | | 434/62 |
| 2016/0124499 A1* | 5/2016 | Shiu | ....................... | G06F 3/011 |
| | | | | 715/778 |

* cited by examiner

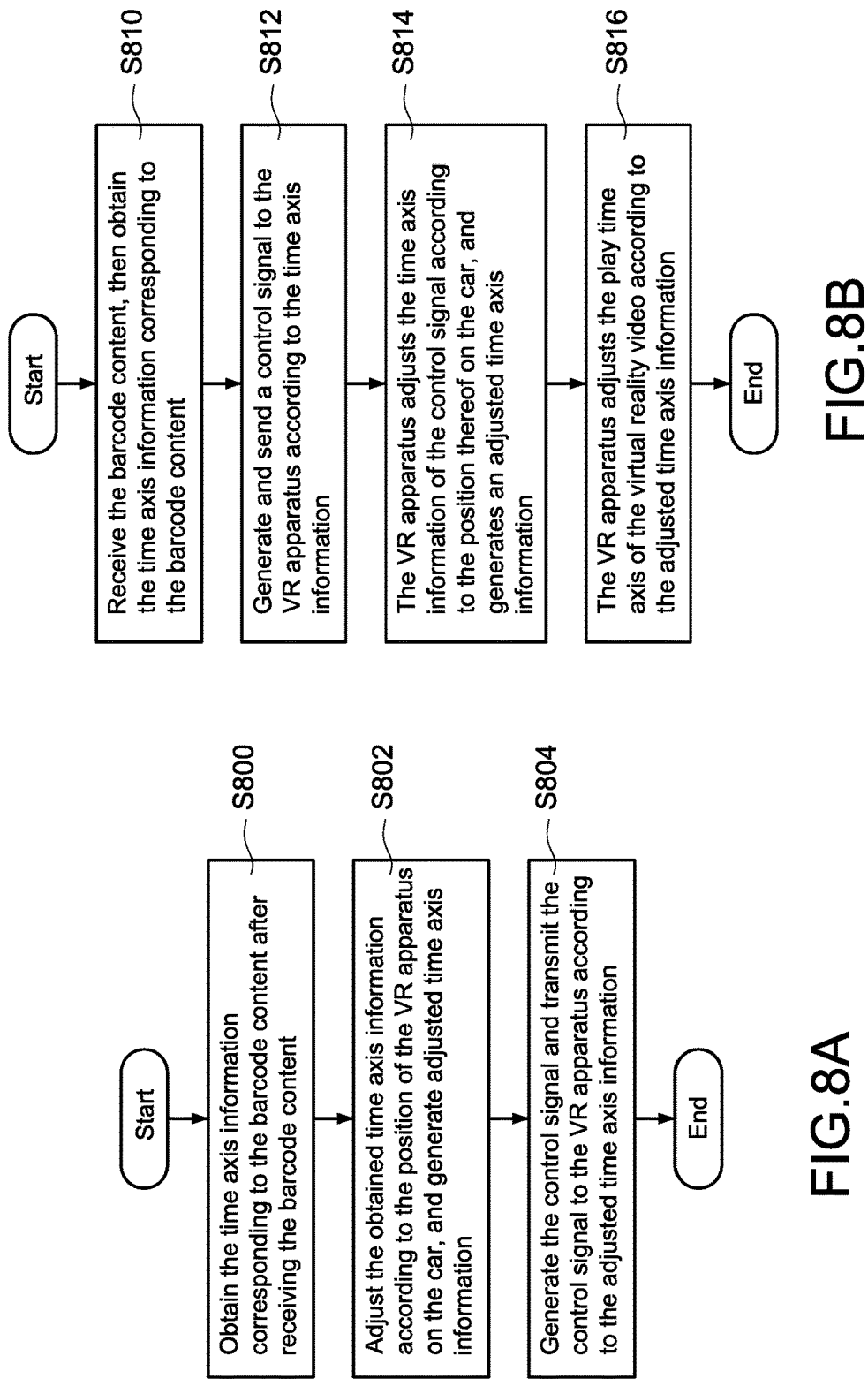

SYNCHRONIZED PLAYING SYSTEM FOR VIRTUAL REALITY IMAGE AND SYNCHRONIZED PLAYING METHOD FOR USING THE SAME

BACKGROUND OF THE INVENTION

Field of the Invention

The present invention relates to virtual reality, especially to synchronized playing system for virtual reality image and synchronized playing method for using the same.

Description of Prior Art

For a long time, different kinds of ride systems, like park car, roller coaster, free fall and other recreational facilities in amusement park, are all very popular.

However, the ride system often has high cost, the amusement park cannot update frequently, thus after playing for a long time, visitors might feel bored.

Recently, virtual reality (VR) technology is developed rapidly, various games are gradually combined with VR technology, to provide player special experience. Thus, some manufactures also think of adopting VR technology to the ride system, to give different experience to visitors riding the same ride system. For example, service staff may give VR apparatuses (such as VR glasses) to the passengers on a roller coaster respectively to wear, and control VR apparatus to play a corresponding VR video when the roller coaster starts moving. In this way, the passengers may obtain absolutely different experience from the played VR video.

However, for the example of roller coaster, the car and track are exposed outside for a long period of time, thus a moving speed of the car is often influenced by factors of temperature, humidity, and friction. Specifically, though start point and end point of the track are fixed, but a moving time spent by the car moving from the start point to the end point may be different due to the above factors (for example, the moving time may vary between 3 m10 s to 3 m12 s).

In view of the above problem, if the VR video is always played when the car starts moving, but there is no synchronization mechanism when the car is moving, the passengers may feel bad due to the effect of moving speed changing. For example, if the friction reduces the moving speed of the car, and makes the car remain going uphill in a scene, while the VR video already starts playing the car going downhill in the video. In this way, passengers may feel sick badly when the virtual image seen by eyes does not match and the actual feeling of body.

SUMMARY OF THE INVENTION

The present invention mainly provides a synchronized playing system and synchronized playing method for virtual reality image, controlling play of VR video according to a current position of the car when a car is moving, to make video content synchronous with the current position of the car.

Accordingly, the present invention discloses a synchronized playing system for virtual reality image, adopted by a ride system having a track and a car running on the track, the synchronized playing system includes a controller system, a synchronized system and a visualization system. The visualization system includes multiple VR apparatuses respectively worn by multiple passengers of the car. The synchronized system includes a barcode arranged on top face of the track and a proximity sensor arranged on bottom face of the car. The controller system includes a calculation unit and a wireless communication unit wirelessly connected with the visualization system.

The calculation unit generates a corresponding control signal and transmits the control signal to the visualization system according to a barcode, when the car is moving and the proximity sensor senses the barcode. In this way, each of the VR apparatuses may respectively perform synchronizing process to a played virtual reality video according to the current position of the car.

Compared to the relative technology of the field, the present invention senses the current position of the car by a barcode arranged on top face of the track and a proximity sensor arranged on bottom face of the car, and controls the play of the virtual reality video according to the current position of the car, then the existing ride system is not needed to be modified and is able to be combined with the VR apparatus, and the cost for building and maintaining the system is effectively reduced.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 8A shows a flowchart of synchronizing time axis according to a first embodiment of the present invention.

FIG. 8B shows a flowchart of synchronizing time axis according to a second embodiment of the present invention.

DETAILED DESCRIPTION OF THE INVENTION

Figure 1:
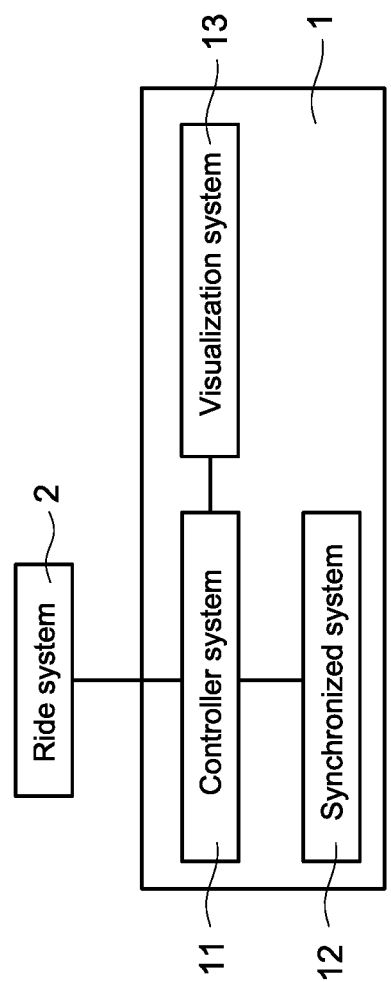
FIG. 1 shows a block diagram of a system according to a first embodiment of the present invention.

Please refer to FIG. 1. First, FIG. 1 shows a block diagram of a system according to a first embodiment of the present invention. The present invention discloses a synchronized playing system 1 (hereafter the system 1) of a virtual reality image, the system 1 mainly includes a controller system 11, a synchronized system 12 and a visualization system 13.

As shown in FIG. 1, the system 1 connects a ride system 2. Specifically, the ride system 2 is any ride system having a track and a car running on the track (such as the track 22 and car 21 shown in FIG. 3). For example, the ride system 2 may be a facility like the roller coaster, garden car, free fall, and the like in the amusement park for the car 21 running on the track 22 in a constant speed and route. In the present invention, the system 1 is adopted to the ride system 2, to make passengers of the ride system 2 experience virtual realities by the system 1.

Figure 2:
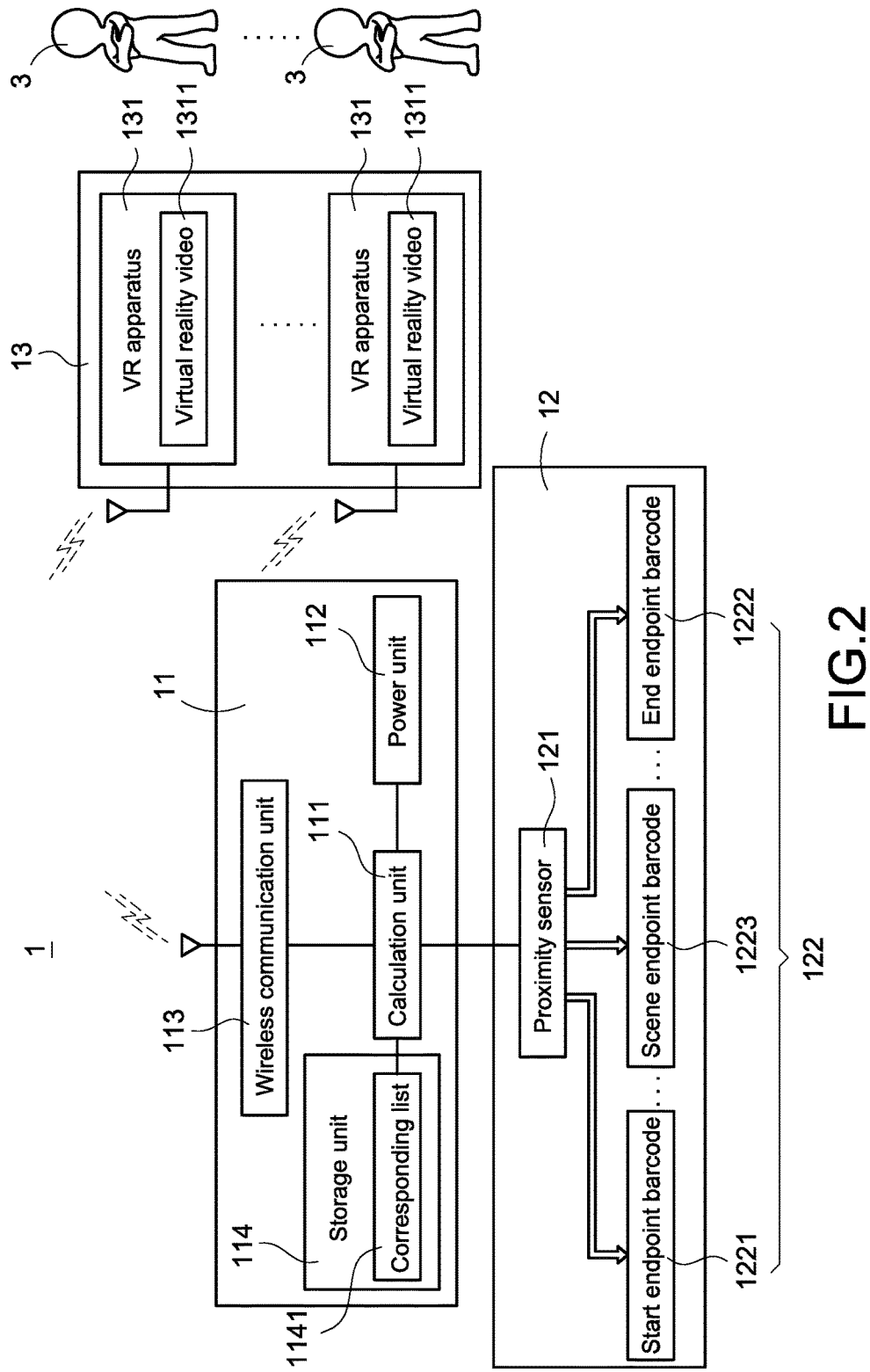
FIG. 2 shows a block diagram of a system according to a second embodiment of the present invention.

Please also refer to FIG. 2. FIG. 2 shows a block diagram of a system according to a second embodiment of the present invention. In the embodiment, the visualization system 13 includes multiple VR apparatuses 131 respectively worn by multiple passengers 3 on the car 21, and each of the VR apparatuses 131 stores an identical virtual reality video 1311. In an embodiment, the VR apparatuses 131 may be VR helmets capable of image processing. In another embodiment, the VR apparatuses 131 may be smart mobile devices and a combination of the smart mobile devices and fixing devices fixing the smart mobile devices in front of the eyes of the passengers 3.

The synchronized system 12 includes a barcode 122 arranged on top face of the track 22, and a proximity sensor 121 arranged on bottom face of the car 21. In an embodiment, the system 1 records an arrangement position of the barcode 122 on the track 22. When the car 21 moves on the track 22 and the proximity sensor 121 senses the barcode 122, the system 1 may get a current position of the car 21 by the barcode 122, and perform synchronizing to the content of the virtual reality video 1311 played by the VR apparatuses 131. In this way, the virtual image seen by the passengers 3 from the VR apparatuses 131 will correspond to the actual scene surrounding the car 21, thus preventing the passengers 3 from feeling sick for the virtual image seen by eyes not in accordance with the actual scene physically experienced by the passengers.

In an embodiment, the barcode 122 may include a start endpoint barcode 1221 and an end endpoint barcode 1222. In another embodiment, the barcode 122 further may include a scene endpoint barcode 1223. The barcodes 1221, 1222, 1223 are respectively arranged on different positions on the track 22, and respectively have different barcode contents and functions (described in detail later).

The controller system 11 includes a calculation unit 111, a power unit 112, a wireless communication unit 113 and a storage unit 114, wherein the calculation unit 111 is electrically connected to the power unit 112, the wireless communication unit 113 and the storage unit 114.

In an embodiment, the power unit 112 is a battery, power supplier or AC power, used for providing the power for operating the controller system 11. The calculation unit 111 also is connected to the proximity sensor 121 of the synchronized system 12, to receive a sensing result of the proximity sensor 121. Specifically, when the proximity sensor 121 senses the barcode 122, a barcode content of the barcode 122 (as the barcode content 1220 shown in FIG. 5) will be fetched and transmitted to the calculation unit 111 such that the calculation unit 111 performs the following process according to the barcode content.

The calculation unit 111 generates a corresponding control signal, and transmits the control signal to the visualization system 13 through the wireless communication unit 113 according to the barcode content of the barcode 122, when the car 21 moves and the proximity sensor 121 senses the barcode 122.

The wireless communication unit 113 is wirelessly connected with the VR apparatuses 131 of the visualization system 13, and transmits the control signal generated by the calculation unit 111 to the VR apparatuses 131. The VR apparatuses 131 may respectively start playing the virtual reality video 1311, stop playing the virtual reality video 1311, or adjust a play time axis of the virtual reality video 1311 according to the received control signal, to perform synchronizing. In an embodiment, the wireless communication unit 113 is a high power Wi-Fi communication unit, but not limited.

In an embodiment, the aforementioned the control signal may include a control command and a time axis information (time code), wherein the time axis information is corresponding to the barcode content of the sensed barcode 122. After the calculation unit 111 receives the barcode content, the calculation unit 111 may obtain the corresponding the time axis information according to the barcode content, and then generate the control signal according to the time axis information and the control command.

In the embodiment, after the VR apparatuses 131 receive the control signal from the controller system 11, the VR apparatuses 131 mainly adjust a play program of the virtual reality video 1311 respectively according to the control command in the control signal, to continue to play the virtual reality video 1311 from an indicated time of the time axis information in the control signal.

More specifically, a corresponding list 1141 is stored in the storage unit 114, and the corresponding list 1141 records the corresponding relation between the barcode content and the time axis information. After the calculation unit 111 receives the barcode content from the proximity sensor 121, the corresponding list 1141 is checked according to the barcode content. Therefore, the calculation unit 111 obtains the time axis information corresponding to the barcode content, and then generates the control signal according to the time axis information.

In an embodiment, the system 1 also may be wirelessly connected with a central computer (not shown) of the ride system 2 through the wireless communication unit 113. When the ride system 2 is activated and the car 21 starts moving (for example, a roller coaster starts moving), the ride system 2 may wirelessly transmit an activating signal to the controller system 11, and when the controller system 11 receives the activating signal, the proximity sensor 121 is triggered to start sensing the barcode 122. The power consumed by the system 1 may be decreased.

Figure 3:
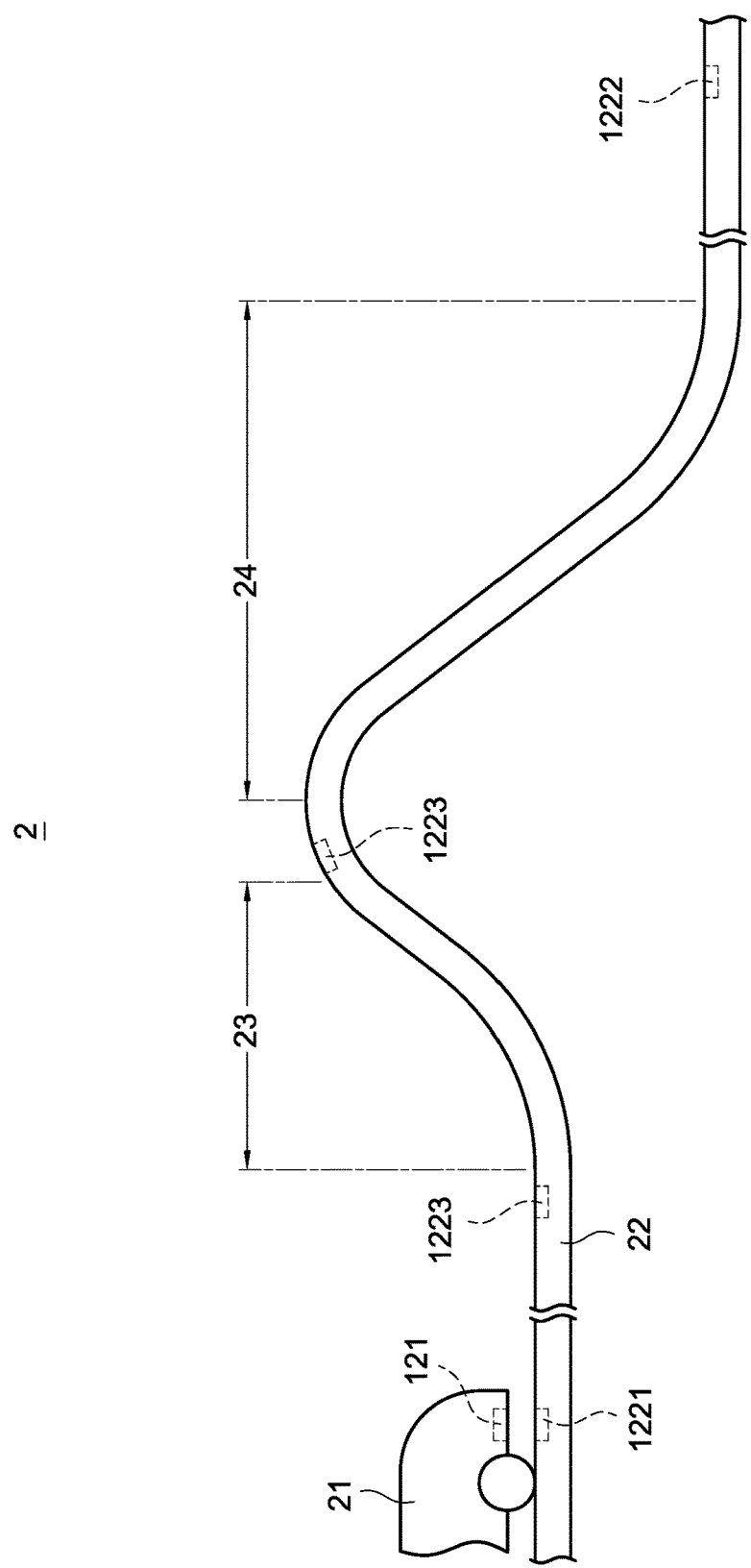
FIG. 3 shows a block diagram of a ride system according to a first embodiment of the present invention.

Please refer to FIG. 3 together. FIG. 3 shows a block diagram of a ride system according to a first embodiment of the present invention. As the embodiment shown in FIG. 3, the ride system 2, for example, is a roller coaster, but not limited.

As shown in FIG. 3, the barcode 122 is arranged and exposed on top face of the track 22, and the proximity sensor 121 is arranged and exposed on bottom face of the car 21. The proximity sensor 121 may sense the barcode 122 and obtain the barcode content of the barcode 122, when the car 21 moves on the track 22 and the proximity sensor 121 passes over the barcode 122.

In an embodiment, the barcode 122 at least includes the start endpoint barcode 1221 of a start position arranged on the track 22, and the end endpoint barcode 1222 of an end position arranged on the track 22. It means that the game starts and the virtual reality video 1311 starts being played, when the car 21 starts moving and the proximity sensor 121 senses the start endpoint barcode 1221. A start control signal is generated and sent to the visualization system 13 according to the barcode content, when the calculation unit 111 receives the barcode content of the start endpoint barcode 1221. Each of the VR apparatuses 131 in the visualization system 13 respectively starts playing the virtual reality video 1311 according to the start control signal.

The car 21 keeps moving and the proximity sensor 121 senses the end endpoint barcode 1222, then it means that the game ends and the virtual reality video 1311 may stop being played. The calculation unit 111 receives the barcode content of the end endpoint barcode 1222, and then an end control signal is generated and sent to the visualization system 13 according to the barcode content. Each of the VR apparatuses 131 in the visualization system 13 respectively stops playing the virtual reality video 1311 according to the end control signal.

In the aforementioned embodiment, the VR apparatuses 131 start playing the virtual reality video 1311 after receiving the start control signal, and stop playing the virtual reality video 1311 after receiving the end control signal, that is, a length of the virtual reality video 1311 relates to a moving time spent by the car 21 moving from the start position of the track 22 to the end position of the track 22.

As mentioned above, the moving time of the car 21 is often different each time due to the influence of temperature, humidity, friction. Accordingly, the length of the virtual reality video 1311 is longer than the moving time spent by the car 21 moving from the start position of the track 22 to the end position of the track 22. For example, the moving time is averaged in a range of 3 m15 s-3 m18 s, and then the length of the virtual reality video 1311 may be in a range of 3 m30 s-4 m. It should be noted that the description above is only for an embodiment, but not a limit of time.

Except for the start endpoint barcode 1221 and the end endpoint barcode 1222, the barcode 122 also includes the scene endpoint barcode 1223 in front of the entrance(s) of one or multiple particular scenes arranged on the track 22. As shown in FIG. 3, a scene endpoint barcode 1223 is arranged on the entrance of an uphill scene 23 on the track 22, and another scene endpoint 1223 is arranged on the entrance of a downhill scene 24 on the track 22.

It needs to be noted that, multiple seats are arranged on the car 21 for multiple passengers to sit, and each seat is arranged at a different position on the car 21. In an embodiment, the proximity sensor 121 may be arranged at any position on bottom face of the car 21, and a distance between the proximity sensor 121 and each of the chairs is different. The VR apparatuses 131 worn by all passengers on the car 21 need to be synchronized before entering the particular scene, thus a distance between the scene endpoint barcode 1223 at the arrangement position on the track 22 and the entrance of the particular scene needs to be longer than a distance between the proximity sensor 121 at arrangement position on the car 21 and the first row of passengers.

For example, the proximity sensor 121 may be arranged on bottom face of center of the car 21. If a distance between a center of the car 21 and the first row of passengers is one meter, then the scene endpoint barcode 1223 needs to be arranged at a position one meter in front of the entrance of the particular scene.

The proximity sensor 121 senses the scene endpoint barcode 1223, then the calculation unit 111 may receive a barcode content of the scene endpoint barcode 1223, and the control signal is generated and sent to each of the VR apparatuses 131 according to the time axis information after the corresponding time axis information is obtained according to the barcode content. In this way, each of the VR apparatuses 131 may adjust a play time axis of the virtual reality video 1311 according to the time axis information in the received control signal.

For example, if a first scene endpoint barcode corresponds to the uphill scene 23, and the uphill video starts from 1 m17 s in the virtual reality video 1311, then the calculation unit 111 obtains the barcode content of the first scene endpoint barcode and checks the corresponding list 1141, then obtains the time axis information of "1 m17 s", and the control signal is accordingly generated and sent. Each of the VR apparatuses 131 receives the control signal, and then adjusts a play program of the virtual reality video 1311, to continue to play the virtual reality video 1311 from the time of 1 m17 s. In this way, the car 21 enters the uphill scene 23, each of the passengers also sees the uphill image by eyes, thus the virtual image seen by eyes is synchronous with the actual scene physically experienced by passengers, and sickness feeling is prevented.

Figure 4:
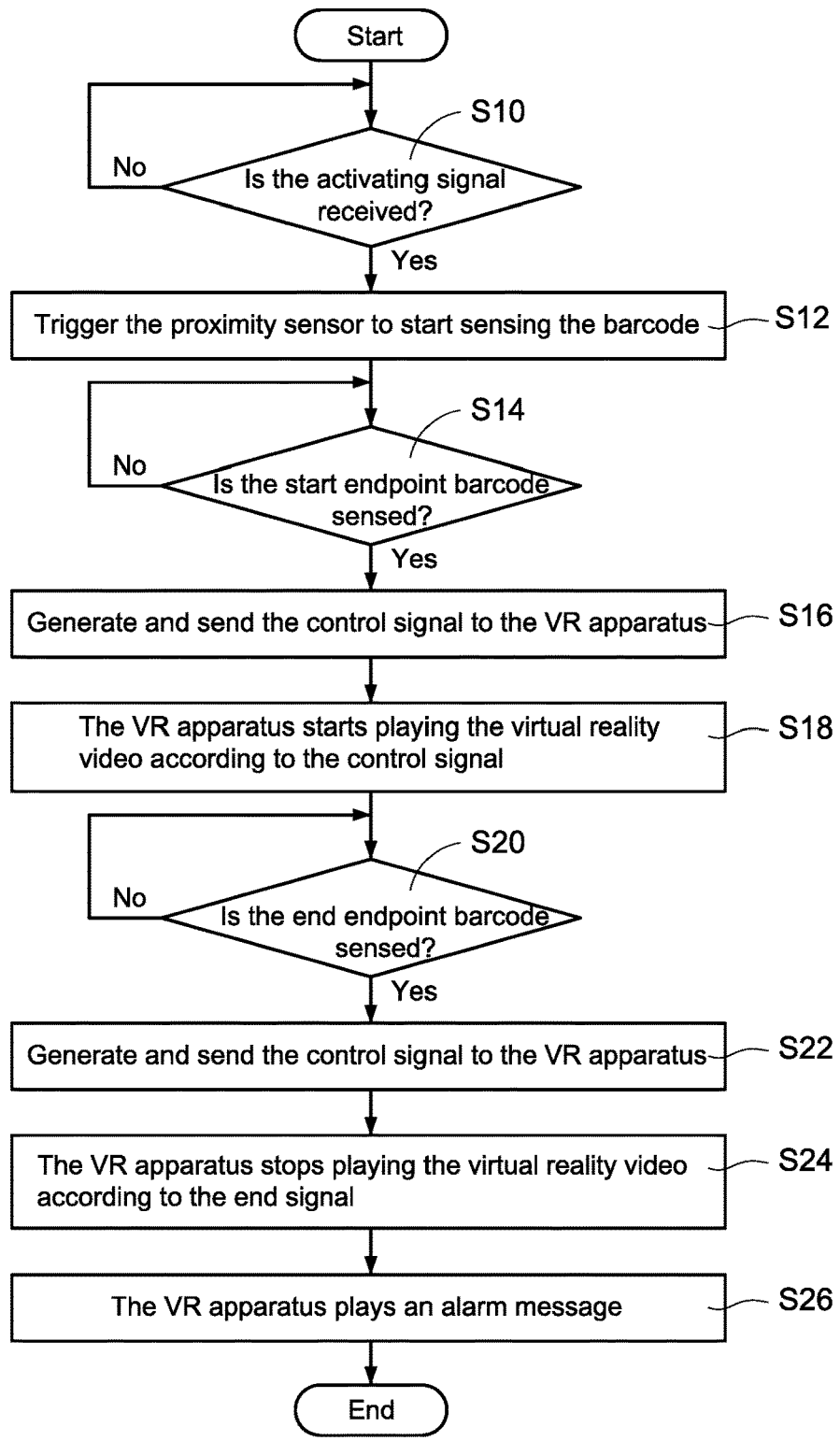
FIG. 4 shows a flowchart of synchronized playing according to a first embodiment of the present invention.

The present invention also discloses a synchronized playing method for virtual reality image adopted by the system 1 (hereafter the method). Please also refer to FIG. 4. FIG. 4 shows a flowchart of synchronized playing according to a first embodiment of the present invention. In the embodiment, the method mainly is adopted by the system 1 as shown in FIG. 1 and FIG. 2.

As shown in FIG. 4, first, the system 1 in standing by status keeps determining if the activating signal is received from the ride system 2 (step S10), that is, determining if the car 21 starts moving. If no activating signal is received, it means that the car 21 has not started moving yet, thus the system 1 keeps performing the step S10. If the activating signal is received, it means that the car 21 starts moving, then the system 1 triggers the proximity sensor 121 of the synchronized system 12 to start sensing the barcode 122 (step S12).

In another embodiment, the system 1 also may not be connected to the ride system 2, and control the proximity sensor 121 to keep performing the sensing program of the barcode 122. In this way, the system 1 is installed and used without adjusting and setting the ride system 21, and the installation and usage of the system 1 is thus easier.

The car 21 starts moving and the proximity sensor 121 is activated, then the system 1 keeps determining if the proximity sensor 121 senses the start endpoint barcode 1221 in the barcode 122 (step S14). If the start endpoint barcode 1221 is not sensed, then the system 1 keeps performing the step S14 to sense the start endpoint barcode 1221. The proximity sensor 121 senses the start endpoint barcode 1221, then the system 1 generates and sends the control signal (specifically, the start control signal) to each of the VR apparatuses 131 (step S16) by the calculation unit 111, and each of the VR apparatuses 131 may start playing the virtual reality video 1311 (step S18) according to the control signal.

It needs to be noted that, the system 1 also may control each of the VR apparatuses 131 to start playing the virtual reality video 1311 at any time point before sensing the start endpoint barcode 1221. In addition, the system 1 may sense the start endpoint barcode 1221, then obtain the corresponding time axis information according to the barcode content of the start endpoint barcode 1221, and generate the start control signal according to the time axis information. In this way, each of the VR apparatuses 131 receives the start control signal, and then adjusts the play program of the virtual reality video 1311, to continue to play the virtual reality video 1311 from a start time indicated by the time axis information, and the implementation of the present invention is not limited to aforementioned step S14 to step S18.

After the virtual reality video 1311 starts playing, the system 1 keeps determining if the proximity sensor 121 senses the end endpoint barcode 1222 in the barcode 122 (step S20). If the end endpoint barcode 1222 is not sensed, it means that the car 21 is moving, thus each of the VR apparatuses 131 keeps playing the virtual reality video 1311. If the end endpoint barcode 1222 is sensed, it means that the car 21 has stopped moving or is about to stop moving, thus the system 1 generates and sends the control signal (Specifically, the end control signal) to each of the VR apparatuses 131 (step S22) by the calculation unit 111, and each of the VR apparatuses 131 stops playing the virtual reality video 1311 according to the end signal (step S24).

In the embodiment, each of the VR apparatuses 1311 stops playing the virtual reality video 1311, and then may further play an alarm message reminding the passengers of taking off the worn VR apparatus 131 (step S26) according to the end control signal. In this way, the passengers are reminded of the car 21 being stopped.

Figure 5A:
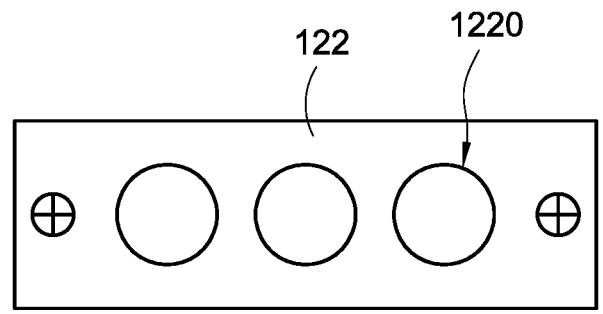
FIG. 5A shows a diagram of a barcode according to a first embodiment of the present invention.
Figure 5B:
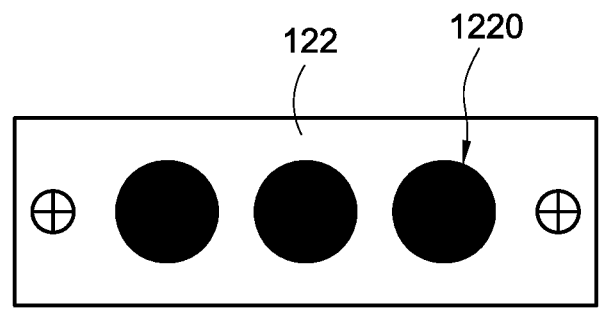
FIG. 5B shows a diagram of a barcode according to a second embodiment of the present invention.

Please refer to FIG. 5A and FIG. 5B, which respectively shows a diagram of a barcode according to a first embodiment of the present invention, and a diagram of a barcode according to a second embodiment of the present invention. In an embodiment, the barcode 122 is made of opaque iron sheet, and the barcode content 1220 is attached to the opaque iron sheet by direct printing or sticking. The opaque iron sheet mainly may be locked on the track 22 by screw, but not limited. In the embodiment, the proximity sensor 121 may be an optical sensor, and may sense and obtain the barcode content 1220 when getting close on the barcode 122.

In the embodiment shown in FIG. 5A and FIG. 5B, the barcode content 1220 is mainly octonary binary code for example, and using 1 to represent white, 0 to represent black. For example, as shown in FIG. 5A, the barcode content 1220 is "0" represented by "000". As shown in FIG. 5A, the barcode content 1220 is "7" represented by "111", but not limited. If the barcode content 1220 is compiled by an octonary binary code, then the system 1 may at most installed one start endpoint barcode 1221, one end endpoint barcode 1222 and six scene endpoint barcodes 1223. If the barcode content 1220 is compiled by a hexadecimal binary code, then the system 1 may at most install one start endpoint barcode 1221, one end endpoint barcode 1222 and fourteen scene endpoint barcodes 1223, and so on.

By the setting of the barcode content 1220, the calculation unit 111 may be informed of the barcode 122 sensed by the proximity sensor 121 being the start endpoint barcode 1221, the end endpoint barcode 1222 or the scene endpoint barcode 1223, and thus may obtain the time axis information corresponding to generate the corresponding control signal.

It needs to be noted that, if the system 1 may, by other methods, obtain the position of the car 21 moving (for example, obtaining rotation data of the motor or rotation axis of the car 21 or the track 22 by the ride system 2, obtaining the current position of the car 21 through GPS system, or obtaining the moving state of the car 21 through the inertial measurement unit), and adjust the play time axis of the virtual reality video 1311 accordingly, then it is not necessary to set the scene endpoint barcode 1223. Therefore, in the embodiment shown in FIG. 4, the system 1 does not need to determine if the proximity sensor 121 senses the scene endpoint barcode 1223.

Figure 6:
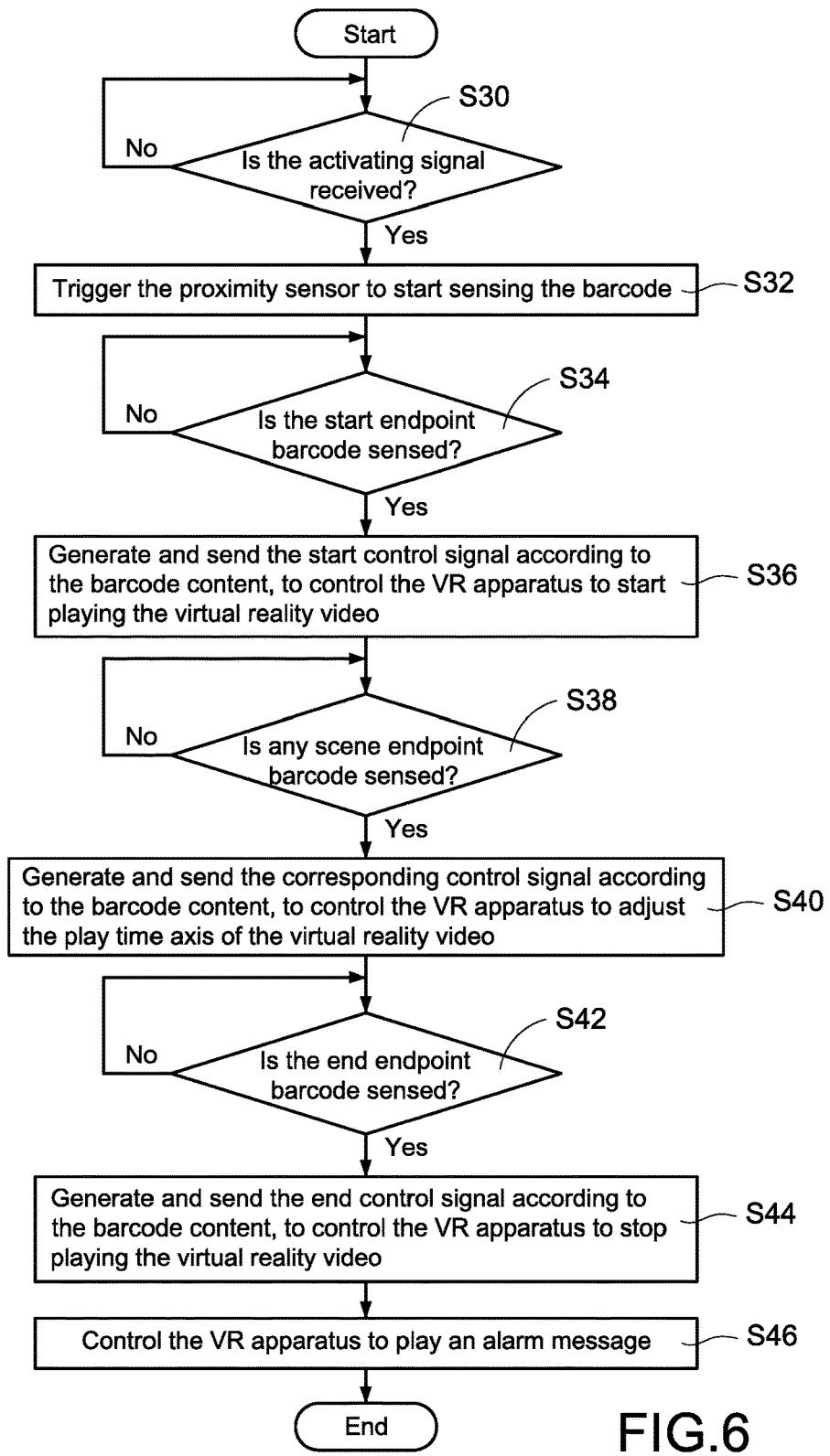
FIG. 6 shows a flowchart of synchronized playing according to a second embodiment of the present invention.

Refer to FIG. 6. FIG. 6 shows a flowchart of synchronized playing according to a second embodiment of the present invention. Similar to the embodiment shown in FIG. 4, the system 1 in standing by status keeps determining if the activating signal is received from the ride system 2 (step S30), and after receiving the activating signal, the system 1 triggers the proximity sensor 121 to start sensing the barcode 122 (step S32). First, the system 1 determines if the proximity sensor 121 senses the start endpoint barcode 1221 (step S34), when sensing the start endpoint barcode 1221, the system 1 generates and sends the start control signal according to the barcode content of the start endpoint barcode 1221, to control each of the VR apparatuses 131 to start playing the virtual reality video 1311 (step S36).

Then, the system 1 keeps determining if the proximity sensor 121 senses any scene endpoint barcode 1223 (step S38). If the proximity sensor 121 senses no scene endpoint barcode 1223, it means that the current scene physically experienced by passengers has not changed (for example, the car 21 keeps moving straight, keeps going up or keeps going down), thus the system 1 does not perform any action. If the proximity sensor 121 senses the scene endpoint barcode 1223, it means that the car 21 will enter next scene, thus the system 1 generates and sends the corresponding control signal according to the barcode content of the scene endpoint barcode 1223, to control each of the VR apparatuses 131 to adjust the play time axis of the virtual reality video 1311 (step S40).

It needs to be noted that, the system 1 may record a sensing-response time of the scene endpoint barcode 1223 (for example, 25 seconds after sensing the start endpoint barcode 1221), and set a tolerance value (for example, 500 ms-10 ms) for the sensing-response time. If the scene endpoint barcode 1223 is still not sensed after a total time of the sensing-response time plus the tolerance value, the system 1 may determine that the proximity sensor 121 or the scene endpoint barcode 1223 is out of function. Then the system 1 may send an alarm signal to a remote central system (not shown) by the wireless communication unit 113, to remind the maintenance staff of maintenance need.

After a known number of the scene endpoint barcodes 1223 all have been sensed, the system 1 then determines if the proximity sensor 121 senses the end endpoint barcode 1222 (step S42), and if the end endpoint barcode 1222 is sensed, the end control signal is generated and sent according to the barcode content of the end endpoint barcode 1222, to control each of the VR apparatuses 131 to stop playing the virtual reality video 1311 (step S44). Finally, the system 1 may also control each of the VR apparatuses 131 to play the aforementioned alarm message (step S46), to instruct the passengers on the car 21 to take off the VR apparatuses 131.

Figure 7A:
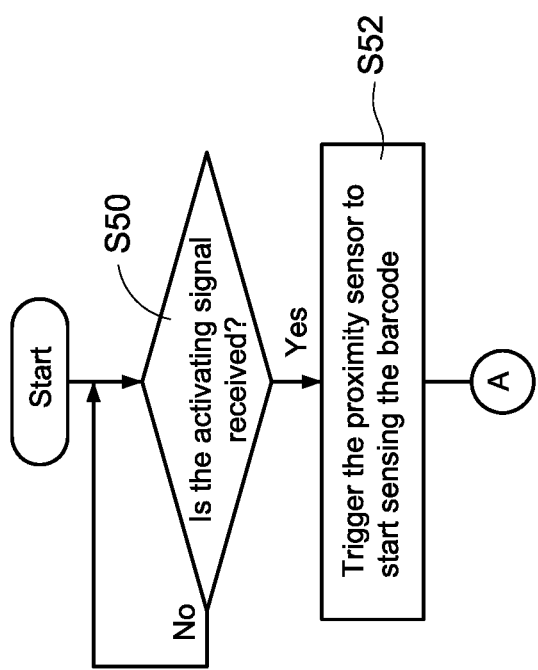
FIG. 7A shows a flowchart of first synchronized playing according to a third embodiment of the present invention.
Figure 7B:
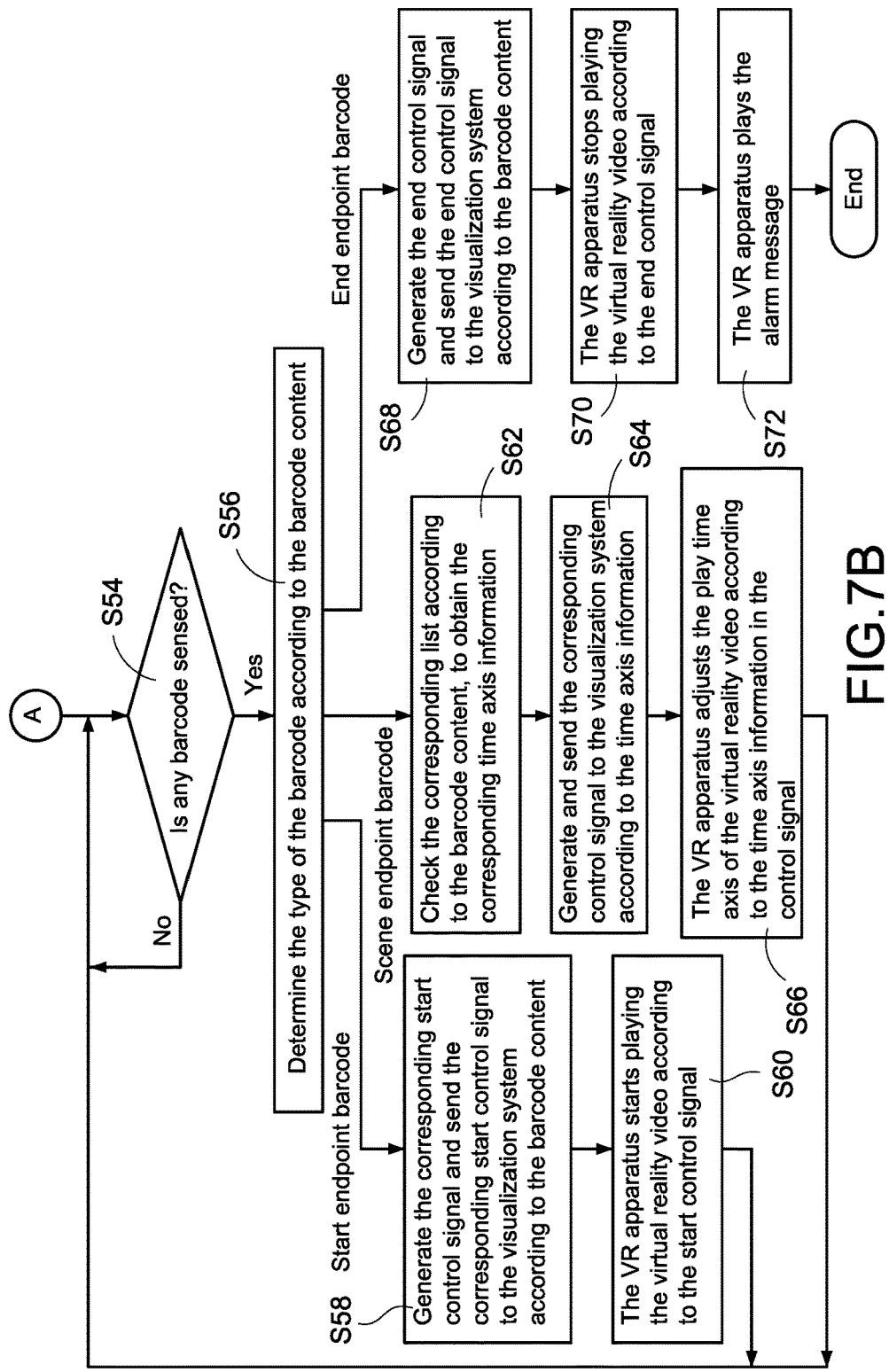
FIG. 7B shows a flowchart of second synchronized playing according to a third embodiment of the present invention.

Please continue to refer to FIG. 7A and FIG. 7B, showing a flowchart of first and second synchronized playing according to a third embodiment of the present invention. FIG. 7A and FIG. 7B disclose another embodiment of the present invention, and the another embodiment is mainly implemented by the system 1 shown in FIG. 1 and FIG. 2.

As shown in FIG. 7A, first, the system 1 in standing by status determines if the activating signal is received from the ride system 2 (step S50), and triggers the proximity sensor 121 to start sensing the barcode 122 after receiving the activating signal (step S52).

As shown in FIG. 7B, after the step S52, the system 1 keeps determining if the proximity sensor 121 senses the barcode 122 (step S54) when the car 21 is moving, that is, determining if the calculation unit 111 receives the barcode content from the proximity sensor 121. After the calculation unit 111 receives the barcode content, the type of the barcode 122 is determined according to the barcode content (step S56).

If the start endpoint barcode 1221 is sensed, then the system 1 generates the corresponding start control signal and sends the corresponding start control signal to the visualization system 13 according to the barcode content (step S58). In this way, each of the VR apparatuses 131 respectively starts playing the virtual reality video 1311 according to the received the start control signal (step S60).

If the scene endpoint barcode 1223 is sensed, then the system 1 checks the corresponding list 1141 according to the barcode content, to obtain the time axis information corresponding to the barcode content (step S62). Then, the corresponding control signal is generated and sent to the visualization system 13 according to the obtained time axis (step S64). In this way, each of the VR apparatuses 131 respectively adjusts the play time axis of the currently played virtual reality video 1311 according to the time axis information in the received the control signal (step S66), to synchronize the play content of the virtual reality video 1311 with the current position of the car 21.

If the end endpoint barcode 1222 is sensed, then the system 1 generates the corresponding end control signal and sends the end control signal to the visualization system 13 according to the barcode content (step S68). In this way, each of the VR apparatuses 131 respectively stops playing the virtual reality video 1311 according to the received end control signal (step S70). In addition, each of the VR apparatuses 131 also plays the alarm message according to the end control signal (step S72).

As mentioned above, multiple seats are arranged on the car 21; the passenger on each seat enters a particular scene on the track 22 at a different time (for example, a time difference between passengers of the first row and passengers of the last row may be 50 ms). If the system 1 receives the scene endpoint barcode 1223, the control signal is generated by a single time axis information, and the play time axis of the virtual reality video 1311 played by each of the VR apparatuses 131 on a different position is adjusted at the same time by the same control signal, then the passengers on different positions may get nonsynchronous experience.

For example, if the passengers of the first row enter the particular scene, and see the virtual image completely synchronized with the actual scene physically experienced by passengers, while the passengers of the last row enter the particular scene, and get a delay of 50 ms, see the virtual image not synchronized with the actual scene physically experienced by passengers, thus may feel uncomfortable.

To solve the delay issue resulting from a predetermined structure of the car 21, the present invention further provides a technical scheme according to the position of each of the VR apparatuses 131 on the car 21 adjusting the play time axis of the virtual reality video 1311.

Please refer to FIG. 8A and FIG. 8B, which respectively show a flowchart of synchronizing time axis according to a first embodiment of the present invention, and a flowchart of synchronizing time axis according to a second embodiment of the present invention. First, as shown in FIG. 8A, after the calculation unit 111 receives the barcode content of the scene endpoint barcode 1223 by the proximity sensor 121, the time axis information corresponding to the barcode content is obtained first (for example, checking the corresponding list 1141) (step S800). Then, the calculation unit 111 adjusts the obtained time axis information, and correspondingly generates multiple adjusted time axis information according to the position of each of the VR apparatuses 131 on the car 21 (step S802).

Then, the calculation unit 111 generates multiple control signals and respectively transmits the multiple control signals to each of the VR apparatuses 131 according to the multiple adjusted time axis information (step S804). In this way, each of the VR apparatuses 131 may respectively adjust the play time axis of the virtual reality video 1311 according to the adjusted time axis information of each of the received control signals.

As mentioned above, each of the VR apparatuses 131 generally has computing capability; each of the VR apparatuses 131 may perform the operation of adjusting the time axis information, and thus reducing the load of the calculation unit 111.

As shown in FIG. 8B, the calculation unit 111 receives the barcode content of the scene endpoint barcode 1223 by the proximity sensor 121, then the time axis information corresponding to the barcode content is obtained first (step S810), and a single control signal is generated according to the time axis information, and sent to each of the VR apparatuses 131 (step S812).

Then, each of the VR apparatuses 131 adjusts the time axis information of the received the control signal, and generates a corresponding adjusted time axis information (step S814) according to the position thereof on the car 21. Finally, each of the VR apparatuses 131 adjusts the play time axis of the virtual reality video 1311 currently played according to the adjusted time axis information calculated (step S816).

Through the aforementioned adjusts program, each of the VR apparatuses 131 plays the identical virtual reality video 1311, however, while entering the particular scene, each of the VR apparatuses 131 continues to play the virtual reality video 1311 from different times according to the position thereof on the car 21. In this way, it may be guaranteed that the passenger on each position on the car 21 may all get visualization completely synchronous with actual experience.

For example, the virtual reality video 1311 starts playing an uphill image on 1 m30 s, the passengers of the first row enter the uphill scene 1 second after the proximity sensor 121 senses the scene endpoint barcode 1223, while passengers of the last row enter the uphill scene 1.5 seconds after the proximity sensor 121 senses the scene endpoint barcode 1223. In this example, the VR apparatuses 131 worn by passengers of the first row receive the control signal, and continue to play the virtual reality video 1311 at 1 m29 s, the VR apparatus 131 worn by passengers of the last row will also receive the control signal, and continue to play the virtual reality video 1311 at 1 m28.5 s. In this way, the passengers on the car 21 will not get different experience because of sitting on different positions.

In the aforementioned embodiment, the system 1 mainly identifies the current position of the car 21 by the proximity sensor 121 and the barcodes 122 of the synchronized system 12, thus synchronizing the virtual reality video 1311 played by each of the VR apparatuses 131 played. However, in other embodiments, the system 1 may also perform synchronization program by other apparatuses.

Figure 9:
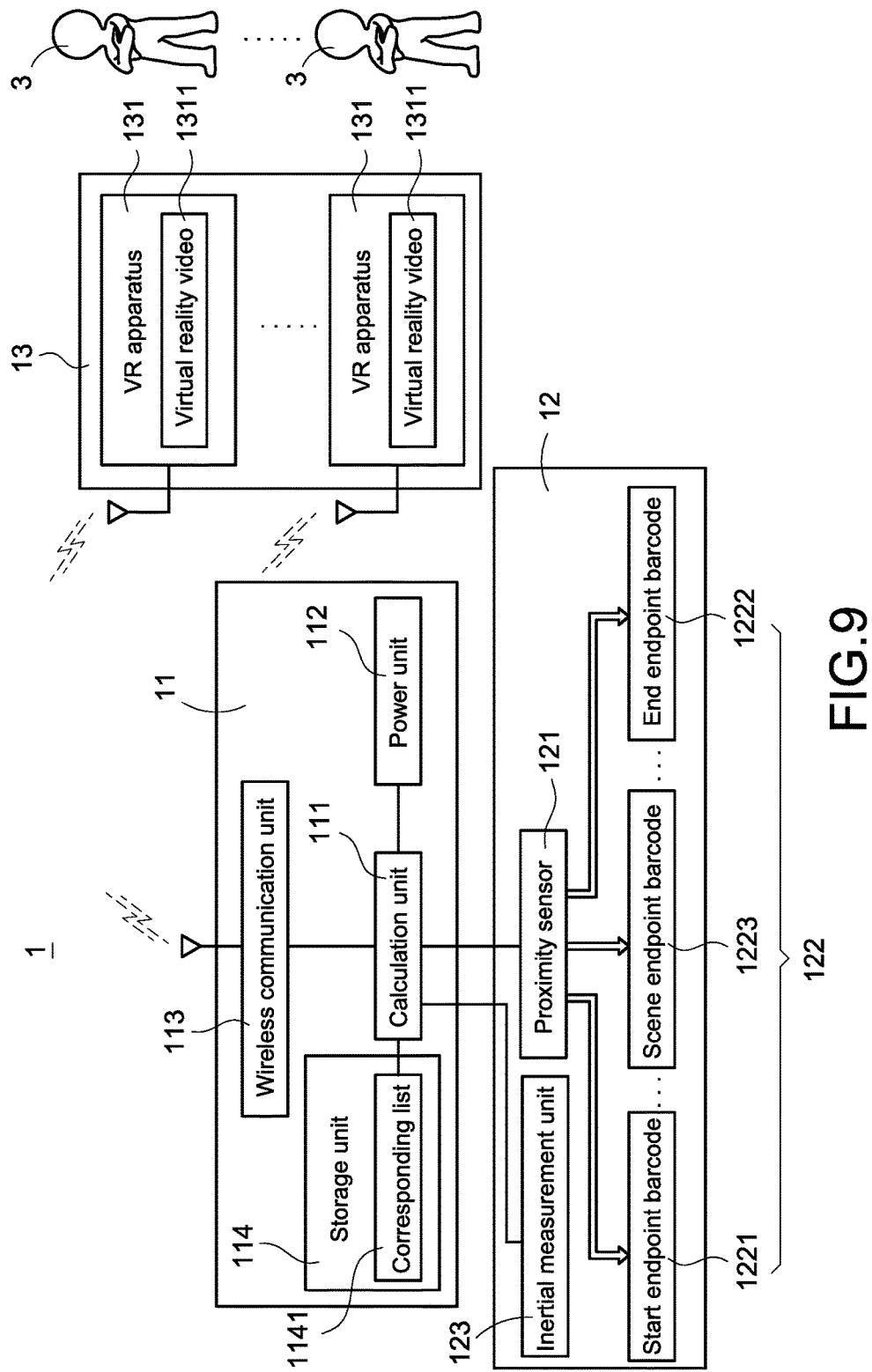
FIG. 9 shows a block diagram of a system according to a third embodiment of the present invention.

Refer to FIG. 9. FIG. 9 shows a block diagram of a system according to a third embodiment of the present invention. In the embodiment shown in FIG. 9, the system 1 includes another synchronized system 12'. The difference between the system 1 in FIG. 9 and the synchronized system 12 in FIG. 2 is that the synchronized system 12' further includes an inertial measurement unit 123; the inertial measurement unit 123 is electrically connected to the calculation unit 111 of the controller system 11.

In the embodiment, the inertial measurement unit 123 is used to sense an inertial data of the car 21 when the car 21 is moving, and to provide the inertial data to the calculation unit 111. The calculation unit 111 may continually or periodically generate a fine-tuning control signal, and transmit the fine-tuning control signal to each of the VR apparatuses 131 according to the inertial data. In this way, each of the VR apparatuses 131 may fine-tune the play frame (frame) of the virtual reality video 1311 currently played according to the received fine-tuning control signal.

In an embodiment, the inertial measurement unit 123 may be arranged on anywhere on the car 21. The inertial measurement unit 123 is trained on the car 21 before being used, in order to obtain the moving trend of the car 21 moving on the track 22 at each position/each time point. The system 1 generates a trend analysis data and stores the trend analysis data in the storage unit 141 according to the moving trend. In the embodiment, the corresponding list 1411 stored in the storage unit 141 also records the corresponding relation between the trend analysis data and the time axis information of the virtual reality video 1311.

In the embodiment, the calculation unit 111 keeps obtaining the inertial data of the car 21 when the car 21 is moving, and performs comparison to the inertial data and the trend analysis data in the corresponding list 1141, to obtain the time axis information corresponding to the matching trend analysis data. In this way, the calculation unit 111 may generate and send the fine-tuning control signal according to the time axis information, to perform fine-tuning to the virtual reality video 1311 currently played by each of the VR apparatuses 131.

Specifically, the controller system 11 has a time adopted by the controller system 11 itself, and each of the VR apparatuses 131 also has the time adopted by each of the VR apparatuses 131. In each of the aforementioned embodiments, the calculation unit 111 of the controller system 11 mainly calculates and generates the control signal according to the time adopted by it. If there is difference between the time adopted by each of the VR apparatuses 131 and that adopted by the controller system 11, then each of the VR apparatuses 131 (according to the time axis information in the aforementioned the control signal) directly adjusting the play time axis of the virtual reality video 1311 still may not perform synchronizing perfectly.

Accordingly, the embodiment obtains the inertial data when the car 21 is moving through the inertial measurement unit 123, and ensures the current position of the car 21 according to inertial data, and then perform fine-tuning to the play time axis of the virtual reality video 1311 played by each of the VR apparatuses 131, according to the current position of the car 21. In this way, the play time axis of the virtual reality video 1311 and the current position of the car 21 are synchronized more accurately.

Figure 10:
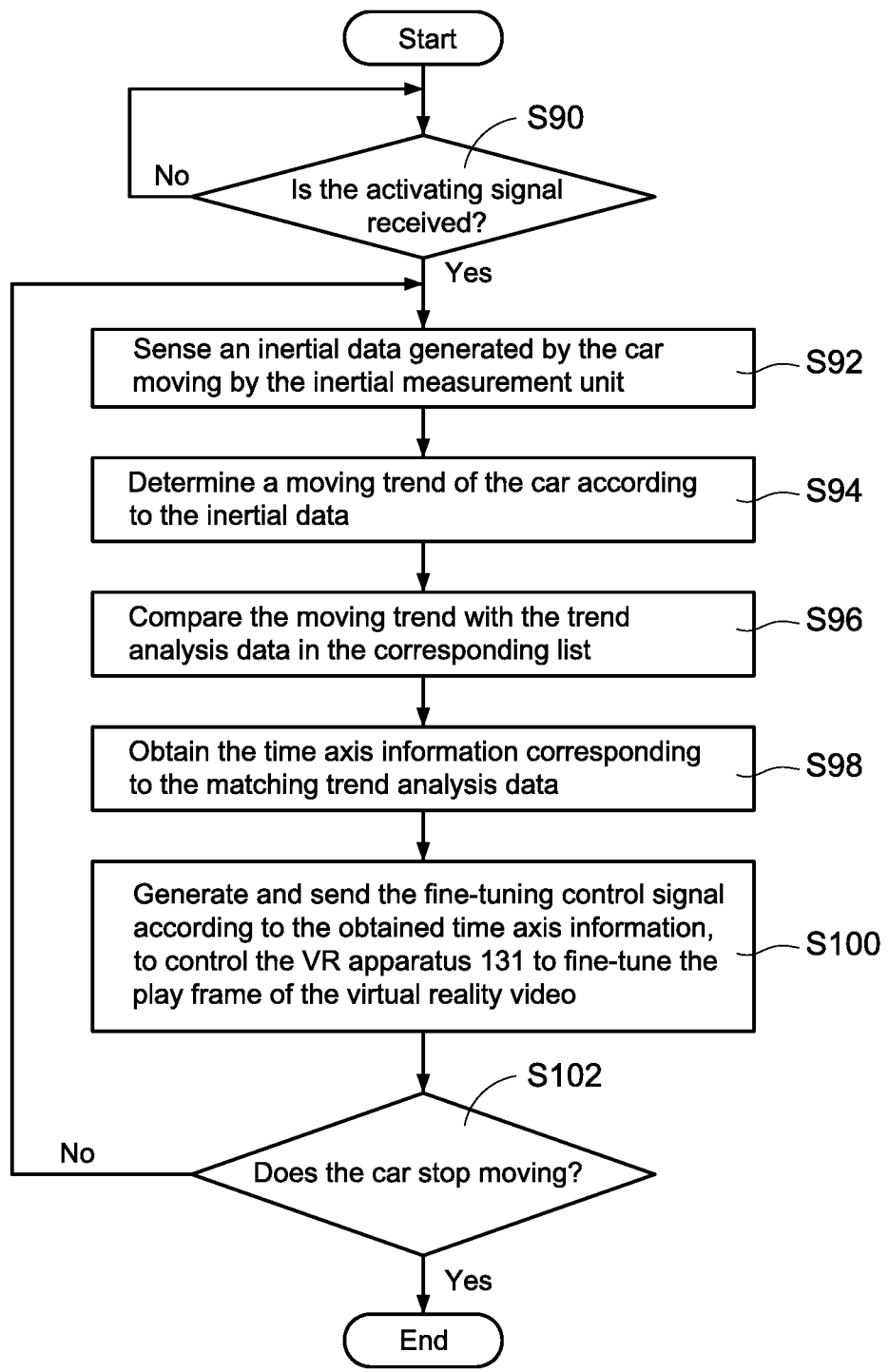
FIG. 10 shows a flowchart of synchronized playing according to a fourth embodiment of the present invention.

Please also refer to FIG. 10. FIG. 10 shows a flowchart of synchronized playing according to a fourth embodiment of the present invention. As shown in FIG. 10, the system 1 keeps determining if the activating signal sent by the ride system 2 is received (step S90) when standing by, and receives the activating signal, then keeps sensing an inertial data generated by the car 21 moving by the inertial measurement unit 123 (step S92). Then, the system 1 may generate and send the fine-tuning control signal to each of the VR apparatuses 131 according to the inertial data.

Specifically, the system 1 determines a moving trend of the car 21 according to the inertial data (for example, moving direction, ascending or descending angles, deflection angle, speed, etc.) (step S94), and compares the moving trend with the trend analysis data in the corresponding list 1411 (step S96). The system 1 then obtains the time axis information corresponding to the matching trend analysis data (step S98). Then, the system 1 may generate and send the fine-tuning control signal according to the obtained time axis information, to control each of the VR apparatuses 131 to fine-tune the play frame of the virtual reality video 1311 currently played (step S100).

Finally, the system 1 determines if the car 21 stops moving (step S102), and keeps executing the step S92 to the step S100 when the car 21 is moving, to keep performing fine-tuning to the play of the virtual reality video 1311 by the inertial data. If the car 21 stops moving, then the system 1 ends the method, and stops measuring the inertial data of the car 21 by the inertial measurement unit 123.

It needs to be noted that, if the system 1 cannot obtain the inertial data of the car 21 in the step S92, or the moving trend of the car 21 cannot be determined in the step S94, it means that the car 21 may already stop moving. In an embodiment, if the car 21 stops moving in a normal time range, the system 1 may determine that the car 21 stops normally (for example, already driving to the end position on the track 22). Otherwise, if the car 21 stops moving out of the predetermined time range, then the system 1 may determine that the car 21 stops abnormally (for example, the car 21 is out of function). If the car 21 stops abnormally, the system 1 may send the alarm signal to the remote central system through the wireless communication unit 113, to remind the maintenance staff of maintenance need, or send the alarm message through each of the VR apparatuses 131, to tell the passengers to take off the worn VR apparatuses 131 for evacuation.

Thus, particular embodiments have been described. Other embodiments are within the scope of the following claims. For example, the actions recited in the claims may be performed in a different order and still achieve desirable results.

What is claimed is:

1. A synchronized playing system for virtual reality image, adopted by a ride system having a track and a car running on the track, the synchronized playing system comprising:

a visualization system comprising multiple VR apparatuses respectively worn by multiple passengers of the car, each of the VR apparatuses storing identical virtual reality video;

a synchronized system comprising a barcode arranged on top face of the track and a proximity sensor arranged on bottom face of the car; and a controller system comprising a wireless communication unit wirelessly connected with the multiple VR apparatuses, and a calculation unit electrically connected to the wireless communication unit and the proximity sensor, wherein the calculation unit is configured to generate a control signal corresponding to a barcode content of the barcode and transmit the control signal to the visualization system through the wireless communication unit, when the car moving and the proximity sensor sensing the barcode, wherein each of the VR apparatuses plays the virtual reality video and performs adjustment to a play time axis according to the control signal.

2. The synchronized playing system for virtual reality image of claim 1, wherein the control system is wirelessly connected with the ride system through the wireless communication unit, receives an activating signal when the car starts moving, and triggers the proximity sensor to start sensing the barcode when receiving the activating signal.

3. The synchronized playing system for virtual reality image of claim 1, wherein the control signal comprises a control command and time axis information, each of the VR apparatuses adjusts a play program according to the control command, to continue to play the virtual reality video from a time indicated by the time axis information.

4. The synchronized playing system for virtual reality image of claim 3, wherein the controller system further comprises a storage unit electrically connected to the calculation unit, a corresponding list is stored in the storage unit store, the corresponding list records a corresponding relation between the barcode content and the time axis information, and the calculation unit performs comparing to the barcode content and the corresponding list to obtain the time axis information correspondingly, and generates the control signal according to the time axis information.

5. The synchronized playing system for virtual reality image of claim 3, wherein the barcode includes a start endpoint barcode and an end endpoint barcode, respectively arranged on a start position and an end position of the track, the calculation unit generates and sends a start control signal when the proximity sensor senses the start endpoint barcode, each of the VR apparatuses starts playing the virtual reality video according to the start control signal, and the calculation unit generated and sent an end control signal when the proximity sensor senses the end endpoint barcode, and each of the VR apparatuses stops playing the virtual reality video according to the end control signal.

6. The synchronized playing system for virtual reality image of claim 5, wherein a length of the virtual reality video is longer than a moving time spent by the car moving from the start position of the track to the end position of the track.

7. The synchronized playing system for virtual reality image of claim 5, wherein the barcode further comprises a scene endpoint barcode arranged in front of an entrance of a particular scene on the track, the calculation unit obtains the time axis information corresponding according to the barcode content of the scene endpoint barcode, generates and sends the control signal according to the time axis information, and each of the VR apparatuses adjusts the play time axis of the virtual reality video according to the time axis information, when the proximity sensor senses the scene endpoint barcode.

8. The synchronized playing system for virtual reality image of claim 5, wherein the synchronized system further comprises an inertial measurement unit electrically connected to the calculation unit, sensing an inertial data of the car when the car moving, the calculation unit according to the inertial data generates and sends a fine-tuning control signal, and each of the VR apparatuses fine tunes a play frame of the virtual reality video according to the fine-tuning control signal.

9. The synchronized playing system for virtual reality image of claim 8, wherein the controller system further includes a storage unit electrically connected to the calculation unit, a corresponding list is stored in the storage unit, the corresponding list records a corresponding relation between a trend analysis data generated from the inertial measurement unit training on the track in advance and the time axis information, and the calculation unit performs comparing to the inertial data and the trend analysis data to obtain the time axis information correspondingly, and generates the fine-tuning control signal according to the time axis information.

10. The synchronized playing system for virtual reality image of claim 1, wherein the barcode is made of an opaque iron sheet, the barcode content is printed on the opaque iron sheet, the proximity sensor is an optical sensor, and the wireless communication unit is a Wi-Fi communication unit.

11. A synchronized playing method for virtual reality image, adopted by the image synchronized playing system of claim 1, the method comprising:
 a) triggering the proximity sensor to start sensing the barcode when the car is moving;
 b) generating a start control signal and transmitting the start control signal to each of the VR apparatuses according to a barcode content of the start endpoint barcode, when sensing a start endpoint barcode in the barcode;
 c) each of the VR apparatuses starting to play the virtual reality image according to the start control signal;
 d) generating an end control signal and transmitting the end control signal to each of the VR apparatuses according to a barcode content of the end endpoint barcode, when sensing an end endpoint barcode in the barcode; and
 e) each of the VR apparatuses stopping playing the virtual reality video according to the end control signal.

12. The synchronized playing method for virtual reality image of claim 11, wherein the step a) is triggering the proximity sensor to start sensing the barcode when receiving an activating signal from the ride system.

13. The synchronized playing method for virtual reality image of claim 11, further comprising a step f): each of the VR apparatuses playing an alarm message of reminding passengers of taking off the VR apparatus according to the end control signal after the step e).

14. The synchronized playing method for virtual reality image of claim 11, wherein the method further comprises the following steps:
 g) when sensing a scene endpoint barcode in the barcode, according to a barcode content of the scene endpoint barcode obtaining a time axis information corresponding, wherein the scene endpoint barcode is arranged in front of an entrance of a particular scene on the track;
 h) generating a control signal and sending the control signal to each of the VR apparatuses according to the time axis information; and
 i) each of the VR apparatuses adjusting a play time axis of the virtual reality video according to the time axis information in the control signal.

15. The synchronized playing method for virtual reality image of claim 14, wherein the method further comprises a step g1): the calculation unit adjusting the time axis information and generating multiple time axis information adjusted according to a position each of the VR apparatuses on the car after step g); the step h) is generating the control signals and respectively transmitting the control signals to each of the VR apparatuses according to the multiple time axis adjusted; the step i) is adjusting a play time axis of the virtual reality video by each of the VR apparatuses respectively according to the time axis information adjusted in each of the control signals.

16. The synchronized playing method for virtual reality image of claim 14, wherein the method further comprises a step h1): each of the VR apparatuses adjusting the time axis information in the control signal according to a position of itself on the car and generating a time axis information adjusted after the step h); the step i) is adjusting a play time axis of the virtual reality video by each of the VR apparatuses according to the time axis information adjusted.

17. The synchronized playing method for virtual reality image of claim 14, wherein a corresponding list recording a corresponding relation between the barcode content and the time axis information is stored in the controller system, and the step g) is obtaining the time axis information corresponding by the calculation unit performing comparing to the barcode content and the corresponding list.

18. The synchronized playing method for virtual reality image of claim 14, wherein the method further comprises the following steps:
- j) sensing an inertial data of the car through an inertial measurement unit when the car is moving;
- k) generating a fine-tuning control signal and sending the fine-tuning control signal to each of the VR apparatuses according to the inertial data; and
- l) each of the VR apparatuses fine tuning a play frame of the virtual reality video according to the fine-tuning control signal.

19. The synchronized playing method for virtual reality image of claim 18, wherein the controller system stores a corresponding list recording a corresponding relation between a trend analysis data generated from the inertial measurement unit training on the track in advance and the time axis information, and the step k) further comprises the following steps:
- k1) determining a moving trend of the car according to the inertial data;
- k2) performing comparing to the moving trend and the trend analysis data in the corresponding list, to obtain the time axis information corresponding to the trend analysis data matching; and
- k3) generating the fine-tuning control signal and transmitting the fine-tuning control signal to each of the VR apparatuses according to the time axis information obtained.

* * * * *